United States Patent [19]

Suzuki et al.

[11] 4,261,219
[45] Apr. 14, 1981

[54] LUBRICATION DEVICE FOR DIFFERENTIAL GEAR UNIT

[75] Inventors: Takaaki Suzuki, Obara; Makoto Uno, Toyota, both of Japan

[73] Assignee: Toyota Jidosha Kogyo Kabushiki Kaisha, Aichi, Japan

[21] Appl. No.: 950,014

[22] Filed: Oct. 10, 1978

[30] Foreign Application Priority Data

May 25, 1978 [JP] Japan .................. 53-70989

[51] Int. Cl.³ .................. F16H 57/04; F16H 1/40
[52] U.S. Cl. .................. 74/467; 74/700; 74/710; 74/713
[58] Field of Search .................. 74/710, 467, 468, 713, 74/694, 700; 184/6.12, 11 R

[56] References Cited

U.S. PATENT DOCUMENTS

| | | | |
|---|---|---|---|
| 1,775,623 | 9/1930 | Morgan . | |
| 2,015,108 | 9/1935 | Harper | 74/467 |
| 2,037,173 | 4/1936 | Matthews | 74/713 X |
| 2,061,009 | 11/1936 | Rothrock | 74/713 |
| 2,142,575 | 1/1939 | Spicacci | 74/710 X |
| 2,368,963 | 2/1945 | Boden | 184/11 R |
| 2,588,670 | 3/1952 | Terry | 74/713 |
| 2,930,448 | 3/1960 | Burnham | 184/11 R |
| 3,162,269 | 12/1964 | Reed | 74/467 X |
| 3,182,527 | 5/1965 | Bryan | 74/467 X |
| 3,202,466 | 8/1965 | Kaptur | 74/713 X |
| 3,260,132 | 7/1966 | West et al. | 74/710 |
| 3,590,954 | 7/1971 | Plantan | 184/6 U |
| 3,715,936 | 2/1973 | Jones | 74/713 |
| 3,825,099 | 7/1974 | Hopf | 184/6.12 |
| 3,838,751 | 10/1974 | Brown | 74/710 X |
| 3,847,249 | 11/1974 | Oehring | 184/11 R X |
| 4,004,472 | 1/1977 | Millward | 74/713 |
| 4,018,097 | 4/1977 | Ross | 74/467 |
| 4,157,045 | 6/1979 | Suzuki | 74/467 X |

FOREIGN PATENT DOCUMENTS

| | | | |
|---|---|---|---|
| 2215410 | 11/1972 | Fed. Rep. of Germany . | |
| 2839886 | 5/1979 | Fed. Rep. of Germany | 74/467 |
| 735413 | 11/1932 | France | 74/700 |
| 53-22445 | 2/1978 | Japan . | |
| 409883 | 5/1934 | United Kingdom . | |
| 590867 | 7/1947 | United Kingdom . | |
| 994292 | 6/1965 | United Kingdom . | |
| 1235326 | 6/1971 | United Kingdom . | |

Primary Examiner—Leslie Braun
Attorney, Agent, or Firm—Armstrong, Nikaido, Marmelstein & Kubovcik

[57] ABSTRACT

A power transmission unit comprises a trans-axle casing provided with an upright partition wall to subdivide the interior of the casing into front and rear chambers and having a cover plate for sealingly closing the forward open end of the front chamber, a differential gear unit arranged within the front chamber and having a pair of side-journals rotatably supported by a pair of spaced tapered roller bearings carried on a pair of carrier portions of the casing, and a crown wheel integral with the differential gear unit and in mesh with a drive pinion of a final drive gearing. The cover plate is provided at its inner wall integral with a pair of lateral protrusions or ribs extending oppositely downwardly from an upper portion of the cover plate toward each of the carrier portions to receive lubricating oil flowing around the crown wheel and convey it into a pair of side-spaces formed behind the roller bearings, and a pair of annular shim plates are further interposed between each of the carrier portions and each of the roller bearings, each of the shim plates being provided with an oil dam to remain a part of the lubricating oil within the side-spaces.

6 Claims, 9 Drawing Figures

LUBRICATION DEVICE FOR DIFFERENTIAL GEAR UNIT

BACKGROUND OF THE INVENTION

The present invention relates to a power transmission unit for motor vehicles, and more particularly to a lubrication device for a differential gear unit of the transmission unit.

In a power transmission unit which comprises a final drive gearing having a drive pinion shaft journalled along the fore-and-aft axis of the vehicle on an upright lateral partition wall of a trans-axle casing, a crown wheel is assembled integral with a differential gear unit in a front chamber formed by the partition wall and is rotated by meshing engagement with a drive pinion integral with the drive pinion shaft to drive the differential gear unit. The differential gear unit is provided with a pair of side-journals which are rotatably supported by a pair of spaced bearings carried on the trans-axle casing, and a pair of wheel axles extending oppositely outwardly from the differential gear unit through the side-journals are surrounded by a pair of seal members carried on the trans-axle casing to retain lubricating oil within the front chamber. In operation of the transmission unit, lubricating oil picked up by rotation of the crown wheel serves to lubricate each side-journal of the differential gear unit and each sealed portion of the wheel axles surrounded by the seal members. It is, however, observed that sufficient lubricating oil may not be supplied to the side-journals and the sealed portions of the wheel axles because the picked up lubricating oil flows mainly around the crown wheel. This results in undesired frictional defacements of the side-journals of the differential gear unit and the seal members.

SUMMARY OF THE INVENTION

It is, therefore, a primary object of the present invention to provide a power transmission unit in which lubricating oil picked up by rotation of the crown wheel is effectively distributed to lubricate each side-journal of the differential gear unit and each sealed portion of the wheel axles.

According to the present invention, there is provided a power transmission unit for a motor vehicle comprising: a trans-axle casing having an upright partition wall for subdividing the interior of the casing into front and rear chambers and being provided with a pair of carrier portions at opposite side of the front chamber, the casing including a cover plate secured in a fluid tight manner to the forward open end of the casing to close the front chamber; a drive pinion shaft rotatably journalled on the partition wall and being provided integral with a drive pinion located in the front chamber; a differential gear unit arranged within the front chamber of the casing and having a pair of side-journals rotatably supported by a pair of spaced tapered roller bearings carried on the carrier portions; a crown wheel integral with differential gear unit and in mesh with the drive pinion; a pair of wheel axles extending oppositely outwardly from the differential gear unit through the respective side-journals; a pair of annular seal members carried on the carrier portions at the outside of the respective side-journals and surrounding each of the wheel axles; and a pair of annular shim plates interposed between each of the carrier portions and each of the roller bearings to support each of the side-journals in place, and in which the cover plate is provided at its inner wall integral with a pair of lateral protrusions extending oppositely downwardly from an upper portion of the cover plate toward the carrier portions to receive lubricating oil flowing around the crown wheel and being communicated at their lower ends into a pair of side-spaces between each of the side-journals and each of the seal members, and in which each of the shim plates is provided with an oil dam to cover the lower portion of an outer race of the respective roller bearings.

Preferably, each of the shim plates has an inner diameter smaller than that of each outer race of the roller bearings to provide the oil dam within the respective side-spaces.

Further, each of the shim plates may be provided with an annular rim projecting radially inwardly therefrom, the annular rim having an inner diameter smaller than that of each outer race of the roller bearings to provide the oil dam within the respective side-spaces.

It is also preferable that each of the shim plates is provided at its lower portion with an enlarged part rim projecting radially inwardly therefrom, the inner diameter of the part rim being smaller than that of each outer race of the roller bearings to provide the oil dam within the respective side-spaces.

BRIEF DESCRIPTION OF THE DRAWINGS

Additional objects and advantages of the present invention will be more readily apparent from the following detailed description of preferred embodiments thereof when taken together with the accompanying drawings in which.

DESCRIPTION OF THE PREFERRED EMBODIMENT

Figure 1:
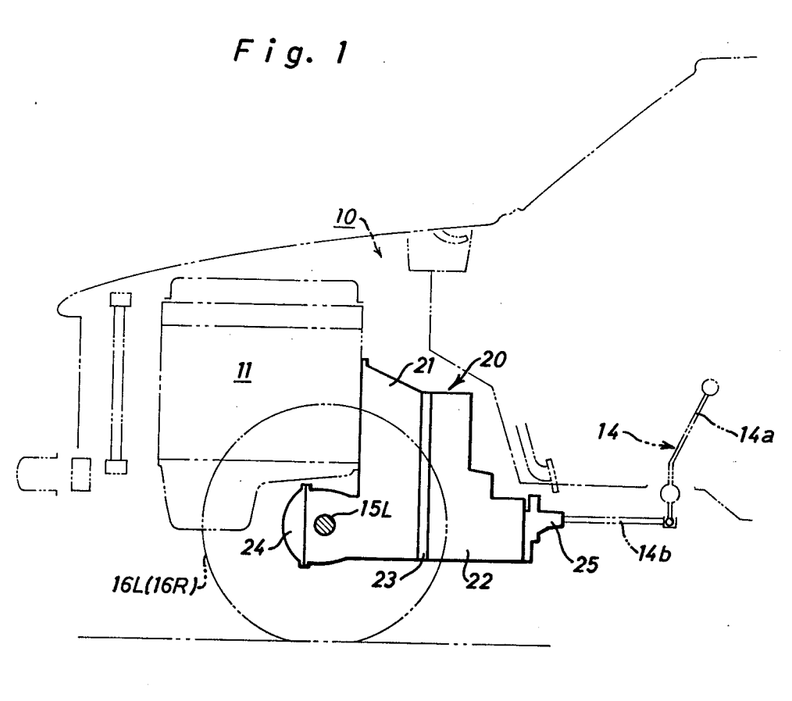
FIG. 1 is a schematic side view of a motor vehicle equipped with a power transmission unit in accordance with the present invention.
Figure 2:
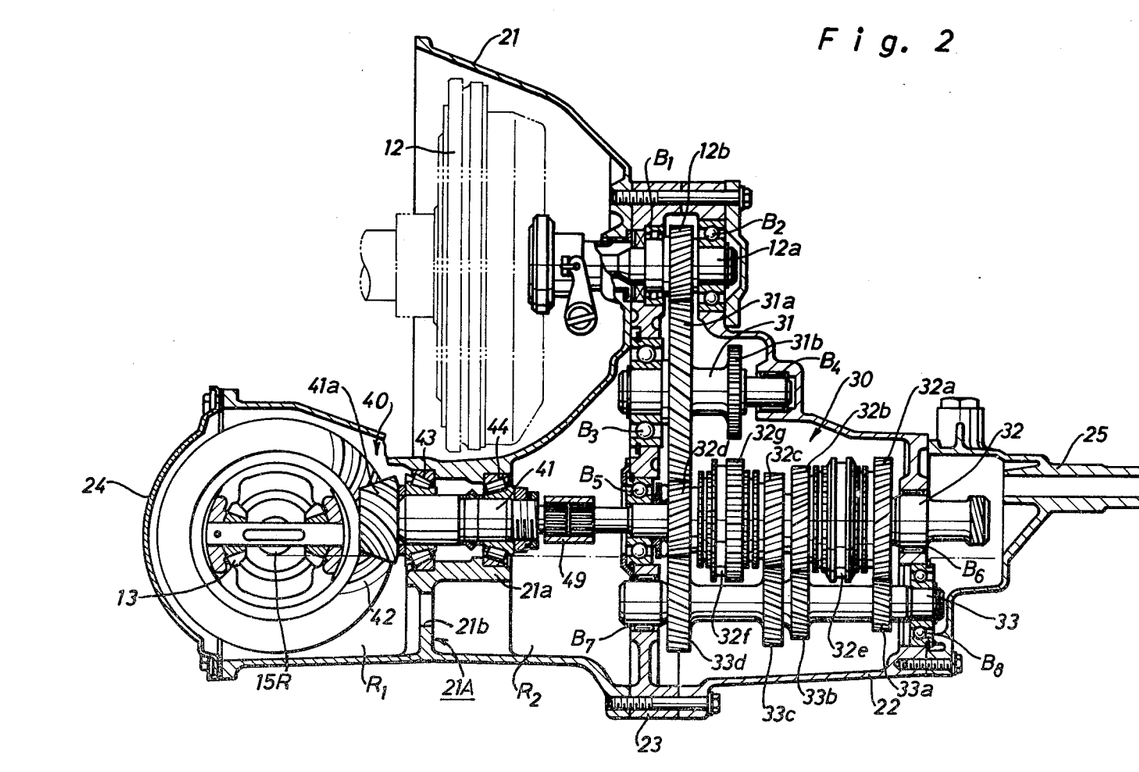
FIG. 2 is an enlarged sectional view of the transmission unit of FIG. 1.

Referring now to the drawings, in particular to FIG. 1, there is illustrated a power transmission unit which is mounted on a motor vehicle 10 of the front-engine, front-wheel drive type. A housing assembly 20 for the transmission unit comprises a trans-axle casing 21 and a transmission casing 22 which are joined to each other in a fluid-tight manner by way of an upright intermediate plate 23. The trans-axle casing 21 is rigidly secured at its upright front seating face to an upright rear seating face of a cylinder block of an engine 11 and, as is shown in FIG. 2, is configured generally to conform with a friction clutch 12 contained in the upper compartment thereof and to conform with a final drive gearing 40 and a differential gear unit 13 contained in the lower compartment thereof. The lower compartment of the trans-axle casing 21 is sealingly closed by a dome-shaped cover plate 24 to retain lubricating oil within the housing assembly 20.

The transmission casing 22 is secured in a fluid-tight manner at its upright front seating face to the upright rear seating face of the trans-axle casing 21 by way of the intermediate plate 23 and is configured generally to conform with a change-speed gearing 30 contained therein. The change-speed gearing 30 is drivingly connected at one hand thereof to a crankshaft of engine 11 through the friction clutch 12 and is connected at the other hand thereof to the differential gear unit 13 through the final drive gearing 40. In addition, an extension housing 25 is secured in a fluid-tight manner to the rear end seating face of the transmission casing 22 to complete the housing assembly 20.

The friction clutch 12 has a power input member for connection to the crankshaft of engine 11 and a power output member 12a supported by a pair of axially spaced bearings $B_1$ and $B_2$ respectively from the intermediate plate 23 and from the transmission casing 22. The power output member 12a is formed with a driving gear 12b located between the bearings $B_1$ and $B_2$ and is further surrounded by a seal member to keep foreign matter out of the casing 22 and to retain lubricating oil within the casing 22. An idler shaft 31 is supported by a pair of axially spaced bearings $B_3$ and $B_4$ respectively from the intermediate plate 23 and from the transmission casing 22 and is also formed with an idler gear 31a and a reverse driving gear 31b. The idler gear 31a is permanently meshed with the driving gear 12b on the power output member 12a, and the reverse driving gear 31b is axially spaced from the idler gear 31a and is located adjacent to the right-hand bearing $B_4$.

The change-speed gearing 30 includes an output mainshaft 32 which is supported by a pair of axially spaced bearings $B_5$ and $B_6$ respectively carried on the intermediate plate 23 and the transmission casing 22. The mainshaft 32 is coaxially connected to a drive pinion shaft 41 of the final drive gearing 40 by means of a spline coupling 49 and is provided thereon with an input gear or fourth gear 32d which meshes with the idler gear 31a of the idler shaft 31 and with a gear 33d integral with a countershaft 33. The countershaft 33 is also formed integral with three further gears 33a, 33b and 33c of differing sizes which are meshed respectively with first, second and third gears 32a, 32b and 32c which are journalled on the mainshaft 32. The selection of gear ratios is effected by a gear-shift mechanism 14 (see FIG. 1) which is operatively connected through a mechanical linkage 14b to a pair of synchronizers 32e and 32f, the gear-shift mechanism 14 being operated by a manual shift-lever 14a.

A reverse gear 32g is formed integral with the second synchronizer 32f and is arranged to be in a common vertical plane with the reverse driving gear 31b when the synchronizer 32f is in its neutral position. If an unshown reverse idler gear is shifted by an unshown shift fork of the gear-shift mechanism 14 under the neutral condition of the synchronizer 32f, the reverse idler gear is brought into engagement with the gears 31b and 32g to establish a reverse torque delivery path between the clutch output member 12a and the mainshaft 32. The countershaft 33 is supported by a pair of axially spaced bearings $B_7$ and $B_8$ respectively from the intermediate plate 23 and the transmission casing 22 and is located substantially at the same height above the ground level as the mainshaft 32 and in parallel with the same. In FIG. 2, the countershaft 33 is, however, illustrated at a position lower than the mainshaft 32 in order to depict clearly the meshing engagement of the gear transmission.

Figure 3:
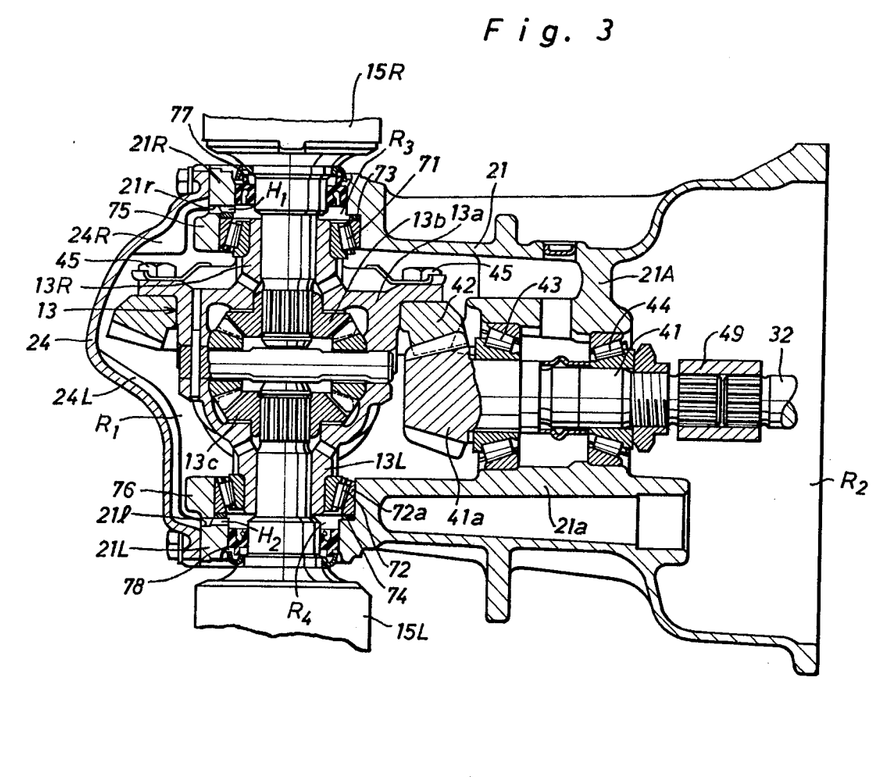
FIG. 3 is an enlarged horizontal sectional view of a final drive gearing and a differential gear unit shown in FIG. 2.
Figure 4:
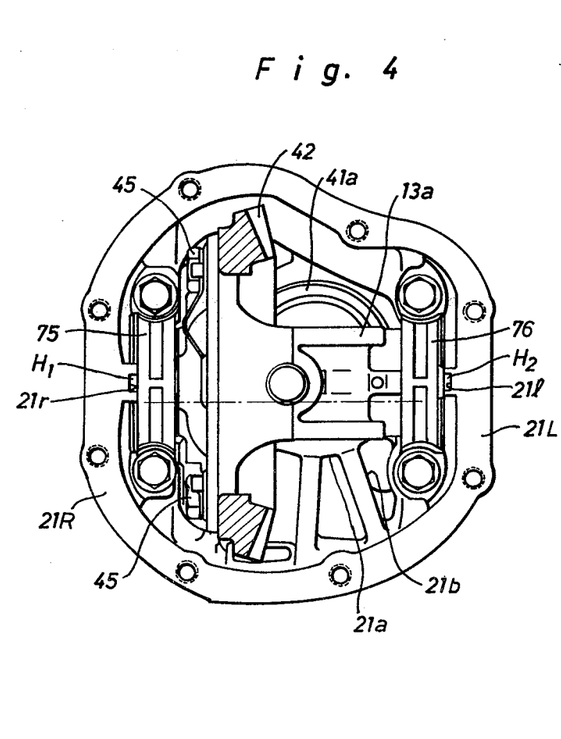
FIG. 4 is an enlarged front view of the differential gear unit of FIG. 2.

As is seen in FIGS. 2 and 3, the trans-axle casing 21 is provided therein with an upright lateral partition wall 21A subdividing the lower compartment into front and rear chambers $R_1$ and $R_2$. The drive pinion shaft 41 of final drive gearing 40 is arranged along the fore-and-aft axis of the vehicle and is supported by a pair of axially spaced tapered roller bearings 43 and 44 carried on a bearing boss 21a of the upright partition wall 21A. A hypoid drive pinion 41a is formed integral with the drive pinion shaft 41 and is meshed with a hypoid crown wheel 42 within the front chamber $R_1$. As shown in FIG. 3, the hypoid crown wheel 42 is secured to a case 13a of differential gear unit 13 by bolts 45 and is rotated by the drive pinion 41a in a counterclockwise direction to transmit drive to the differential gear unit 13. Furthermore, the upright partition wall 21A is provided at its bottom portion with an axial through hole 21b connecting the front chamber $R_1$ with the rear chamber $R_2$. In addition, a predetermined amount of lubricating oil is stored within the bottom of the housing assembly 20 so that the lower portions of the crown wheel 42, the gears on the mainshaft 32, and the gears on the countershaft 33 dip into the lubricating oil. In FIGS. 2 and 4, dot and dash lines indicate a liquid surface of the lubricating oil in the inoperative condition of the transmission unit.

As is illustrated in FIGS. 3 and 4, the case 13a of differential gear unit 13 is provided with a pair of cylindrical sleevelike side-journals 13R, 13L rotatably supported by a pair of tapered roller bearings 71, 72 which are carried on a pair of carrier portions 21R, 21L of trans-axle casing 21. The roller bearings 71, 72 are firmly secured in place by fastening bolts threaded into the carrier portions through a pair of retainer members 75, 76 as shown in FIG. 4, and each position of the bearings 71, 72 is transversely adjusted by a pair of annular shim plates 73, 74 in accordance with backlash between the drive pinion 41a and crown wheel 42. A pair of wheel axles 15R, 15L are rotatably supported by the respective side-journals 13R, 13L of case 13a and extended oppositely outwardly from the trans-axle casing 21 through a pair of seal members 77, 78. The seal members 77, 78 are mounted on the carrier portions 21R, 21L at the outside of the respective roller bearings 71, 72 to sealingly support the wheel axles 15R, 15L thereon. A pair of side-gears 13b, 13c of differential gear unit 13 are splined with each inner end of the wheel axles 15R, 15L and meshed in the usual manner with differential pinions (unnumbered). Furthermore, the wheel axles 15R, 15L are operatively connected at their outer ends with front road-wheels 16R, 16L respectively.

Figure 6:
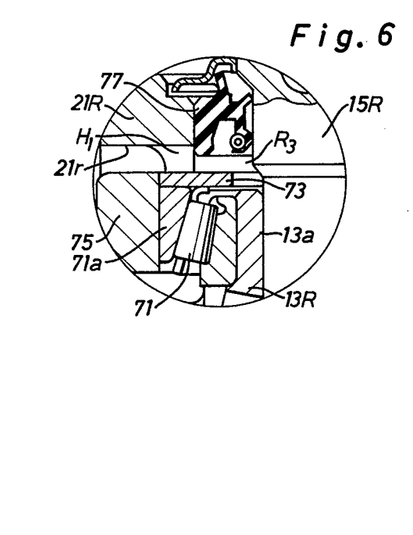
FIG. 6 is an enlarged sectional view of a part of FIG. 3, showing a lubricating passage between a retainer member and a carrier portion.

To sufficiently supply lubricating oil to the roller bearings 71, 72 the side-journals 13R, 13L and the seal members 77, 78, the above embodiment is characterized by the following. The carrier portions 21R, 21L of trans-axle casing 21 are provided at their inner faces with axial recesses 21r, 21l in a horizontal direction respectively in such a manner that a pair of lubricating passages $H_1$, $H_2$ are formed between the respective retainer members 75, 76 and the respective carrier portions 21R, 21L. The lubricating passages $H_1$, $H_2$ communicate the interior of the front chamber $R_1$ into a pair of side-spaces $R_3$, $R_4$ formed around each of the wheel axles 15R, 15L between the respective roller bearings 71, 72 and the respectively seal members 77, 78. As is clearly seen in FIG. 6, each of the annular shim plates 73, 74 has an inner diameter smaller than that of each outer race 71a, 72a of the roller bearings 71, 72. Thus, each lower portion of the shim plates 73, 74 serves as an oil dam to store an amount of lubricating oil within the side-spaces $R_3$, $R_4$.

Figure 5:
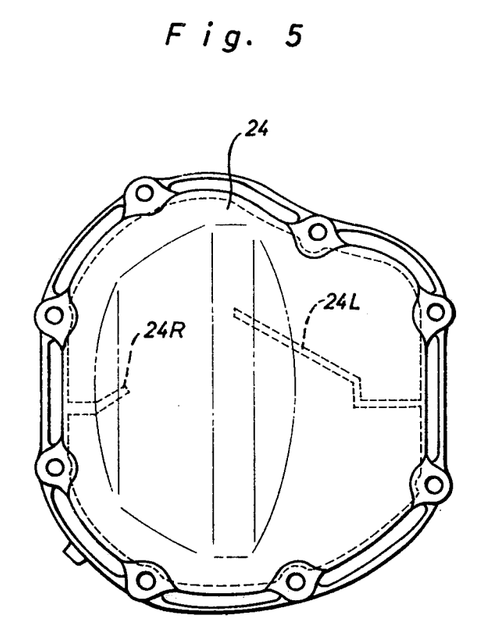
FIG. 5 is an enlarged front view of a dome-shaped cover plate shown in FIG. 2.

Furthermore, the dome-shaped cover plate 24 is formed at its inner wall integral with a right-hand lateral protrusion 24R and a left-hand lateral protrusion 24L. As shown in FIG. 5, the right-hand protrusion 24R is located at right side of the crown wheel 42 and extends downwardly from an upper portion of the cover plate 24 toward the axial recess 21r of carrier portion 21R to convey lubricating oil into the passage $H_1$. Meanwhile, the left-hand protrusion 24L is located at left side of the crown wheel 42 and extends downwardly from an upper portion of the cover plate 24 toward the axial recess 21l of carrier portion 21L to convey lubricating oil into the passage $H_2$. Each of the protrusions 24R, 24L is fromed as a reinforcement rib in the casting process of the cover plate 24 and is flatten at its lower end portion. In addition, each of the retainer members 75, 76 is preferably thicken at the central portion thereof to narrow each clearance between the respective protrusions 24R, 24L and the respective retainer members 75, 76 thereby to reduce lubricating oil dropping from the protrusions.

In operation, assuming that a selected one of the forward speed ratios in the change-speed gearing 30 is engaged by operation of the gear-shift mechanism 14, rotation torque from the engine 11 is conveyed to the driving gear 12b by way of the friction clutch 12 and then transmitted to the countershaft 33 by way of the idler gear 31a and fourth gear 32d. When the countershaft 33 is rotated, the first, second and third gears on the mainshaft 32 are rotated by engagement with the gears 33a, 33b and 33c on the countershaft 33 such that the mainshaft 32 is driven under the selected forward speed ratio. The rotation torque of mainshaft 32 is transmitted to the drive pinion shaft 41 through the spline coupling 49 and, in turn, the crown wheel 42 is rotated in a counterclockwise or forward direction by engagement with the drive pinion 41a of shaft 41 to drive the differential gear unit 13.

During operation, the lubricating oil is stirred up by rotation of the respective gears on the mainshaft 32 and the countershaft 33 and is also picked up by rotation of the crown wheel 42 and the differential gear unit 13 in the front chamber $R_1$. Thus, the picked up lubricating oil directly splashes onto the drive pinion 41a and the bearing 43 and flows around the crown wheel 42. The lubricating oil flowing around the crown wheel 42 splashes onto the inner wall surface of the dome-shaped cover plate 24 by centrifugal force and is received by the protrusions 24R, 24L. Further, the lubricating oil is guided by the protrusions 24R, 24L downwardly toward the carrier portions 21R, 21L of casing 21 and flows into the spaces $R_3$, $R_4$ through the respective passages $H_1$, $H_2$ to lubricate the seal members 77, 78, the roller bearings 71, 72 and the side-journals 13R, 13L of differential case 13a thereby to prevent frictional defacements of them. Then, the lubricating oil in the right-hand space $R_3$ returns through the bearing 71 into the front chamber $R_1$, while the lubricating oil in the left-hand space $R_4$ returns through the bearing 72 into the front chamber $R_1$. In continuous circulation of the lubricating oil, it will be noted that a portion of the lubricating oil is stored within the side-spaces $R_3$, $R_4$ due to each oil dam of the shim plates 73, 74. This serves to constantly lubricate the seal members 77, 78 thereby to ensure durability of them.

When the reverse torque delivery path is established by operation of the gear-shift mechanism 14, the reverse driving gear 31b is coupled with the reverse gear 32g by way of the reverse idler gear to rotate the mainshaft 32 in a reverse direction. This results in clockwise rotation of the crown wheel 42 in the front chamber $R_1$. In this instance, the lubricating oil in front chamber $R_1$ is picked up by the clockwise rotation of the crown wheel 42 and flows around the same. Then, the lubricating oil partly splashes onto the inner wall surface of cover plate 24 and is received by the protrusions 24R, 24L to lubricate the seal members 77, 78, the roller bearings 71, 72 and the side-journals 13R, 13L of differential case 13a. Other operation under the reverse drive is substantially the same as that under the above-noted forward drive.

Figure 7:
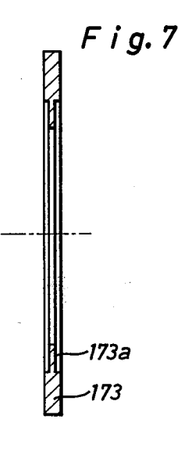
FIGS. 7 to 9 illustrate modifications of a shim plate shown in FIG. 6.
Figure 8:
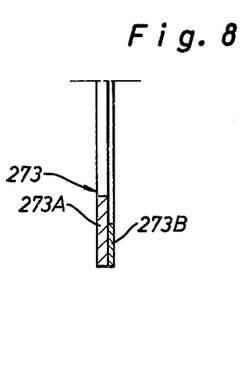
Figure 9:
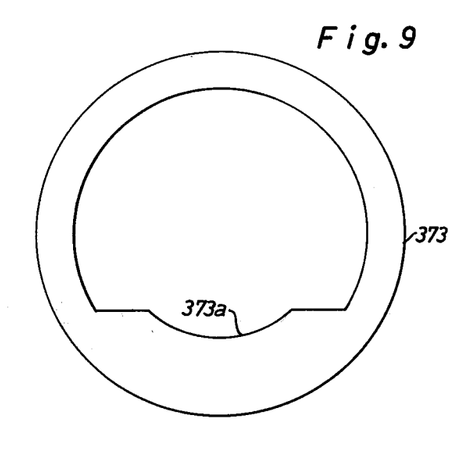

In practice of the embodiment, each of the shim plates 73, 74 may be modified as illustrated in FIGS. 7 to 9. In FIG. 7, there is shown a modified shim plate 173 which corresponds with the shim plate 73 and is provided with annular rim 173a projecting radially inwardly from plate 173. The annular rim 173a has an inner diameter smaller than that of the outer race 71a of roller bearing 71 to form an oil dam within the side-space $R_3$. In FIG. 8, there is shown a modified shim plate assembly 273 which corresponds with the shim plate 73 of FIG. 6. The shim plate assembly 273 includes a first shim plate 273A facing the side-space $R_3$ and a second shim plate 273B abutting against the outer race 71a of roller bearing 71. The first shim plate 273A has an inner diameter smaller than that of the outer race 71a of roller bearing 71 to form an oil dam within the side-space $R_3$. In FIG. 9, disclosed in another modified shim plate 373 which corresponds with the shim plate 73 of FIG. 6. The shim plate 373 is provided at its lower portion with an enlarged rim 373a projecting radially inwardly therefrom, the inner diameter of rim 373a being smaller than that of the outer race 71a of roller bearing 71 to provide an oil dam within the side-space $R_3$. Furthermore, it will be noted that the present invention may be adapted to a motor vehicle of the rear-engine, rear-wheel drive type.

Although a certain specific embodiment of the present invention has been shown and described, it is obvious that many modifications and variations thereof are possible in light of these teachings. It is to be understood therefore that within the scope of the appended claims, the invention may be practiced otherwise than as specifically described herein.

What is claimed is:

1. In a power transmission unit for a motor vehicle, the transmission unit comprising a trans-axle casing having an upright seating face for rigidly securing said casing to a cylinder block of an engine and having an upright partition wall for subdividing the interior of said casing into front and rear chambers, said trans-axle casing being provided with a cover plate which sealingly closes the open end of the front chamber which is remote from the rear chamber, a drive pinion shaft rotatably journalled along the fore-and-aft axis of the vehicle on said partition wall and including a drive pinion integral with said drive pinion shaft and located in the front chamber, a differential gear unit arranged within the front chamber of said casing and having a pair of side-journals rotatably supported by a pair of spaced side-bearings carried on a pair of carrier portions of said trans-axle casing, a crown wheel integral with said differential gear unit and in mesh with said drive pinion to drive said differential gear unit, a pair of wheel axles extending oppositely outwardly from the differential gear unit through the respective side-journals and surrounded by a pair of annular seal members carried on the respective carrier portions, and a pair of annular shim plates interposed between each of the carrier portions and each of the side-bearings to support each of the side-journals in place, the improvement wherein said cover plate includes a pair of lateral protrusion means integrally formed on the inner wall of said cover plate with said pair of lateral protrusion means forming a reinforcement rib means for strengthening said cover plate, said lateral protrusion means extending downwardly at both sides of said crown wheel from the upper portion of said cover plate with the lower ends thereof extending into a pair of side-spaces formed around each of said wheel axles between the respective side-bearings and the respective seal members, wherein said lateral protrusion means receive lubricating oil flowing around said crown wheel and carry the lubricating oil into each of said side-spaces and wherein each of said shim plates is provided with an oil dam to cover the lower portion of each outer race of the side-bearings.

2. A power transmission unit as claimed in claim 1, wherein each of the side-spaces is opened at the front side thereof toward the respective lower ends of said lateral protrusions.

3. A power transmission unit as claimed in claim 1, wherein said shim plates are continuous.

4. A power transmission unit as claimed in any of claims 1–3, wherein each of said shim plates has an inner diameter smaller than that of each outer race of the side-bearings to provide said oil dam within said respective side-spaces.

5. A power transmission unit as claimed in any of claims 1–3, wherein each of said shim plates is provided with an annular rim projecting radially inwardly therefrom, said annular rim having an inner diameter smaller than that of each outer race of the side-bearings to provide said oil dam within said respective side-spaces.

6. A power transmission unit as claimed in any of claims 1–3, wherein each of said shim plates is provided at its lower portion with an enlarged rim projecting radially inwardly therefrom, the inner diameter of said enlarged rim being smaller than that of each outer race of the side-bearings to provide said oil dam within said respective side-spaces.

* * * * *